Dec. 3, 1929.  H. W. SMITH  1,738,212
AUTOMATIC DRIVING CLUTCH
Filed Aug. 31, 1925  2 Sheets-Sheet 1

INVENTOR.
Horatio W. Smith
BY Dewey, Strong, Townsend & Loftus
ATTORNEYS.

Dec. 3, 1929.                H. W. SMITH                 1,738,212
                        AUTOMATIC DRIVING CLUTCH
                          Filed Aug. 31, 1925          2 Sheets-Sheet 2

INVENTOR.
Horatio W. Smith
BY
Dewey, Strong, Townsend & Loftus
ATTORNEYS.

Patented Dec. 3, 1929

1,738,212

UNITED STATES PATENT OFFICE

HORATIO W. SMITH, OF LOS ANGELES, CALIFORNIA, ASSIGNOR, BY MESNE ASSIGNMENTS, TO EIGHT-WHEEL MOTOR VEHICLE COMPANY, OF SAN FRANCISCO, CALIFORNIA, A CORPORATION OF CALIFORNIA

AUTOMATIC DRIVING CLUTCH

Application filed August 31, 1925. Serial No. 53,480.

This invention relates to an automatic driving clutch for four-wheel drives such as are employed on motor trucks and like vehicles.

Four-wheel drives for motor vehicles and the like have come into more or less common use, particularly where the four wheels are placed at the rear end of the vehicle. The wheels are arranged in pairs with a differential interposed between each pair, and the differentials are driven from a common drive shaft, all four wheels being thus positively driven at all times.

In actual practice, it is found that one pair of driving wheels is more than sufficient for traction purposes when traveling over ordinary or level roads, and it would therefore be ideal if the second pair of driving wheels could run idle under such conditions and only be called into play when actually required, for instance, when striking a grade or when traveling over slippery road surfaces or the like.

The object of the present invention is to bring about this very condition: first, by providing means whereby one pair of wheels may idle when traveling over ordinary road surfaces; and, secondly, by providing means whereby said wheels will be automatically thrown into driving operation the moment the driving wheels begin to lose traction.

One form which my invention may assume is exemplified in the following description and illustrated in the accompanying drawings, in which—

Figure 1:
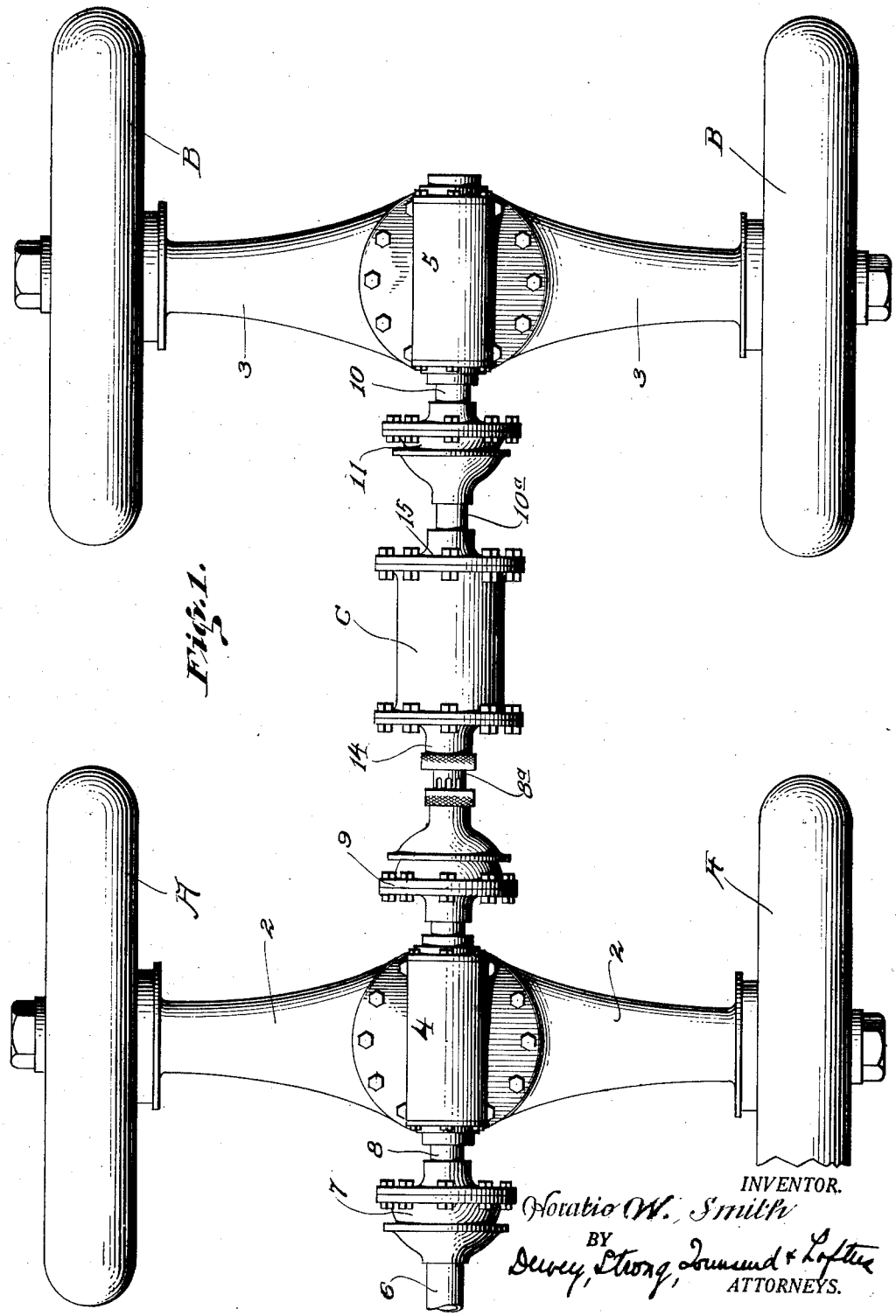
Fig. 1 is a plan view showing two pair of driving wheels adapted to be disposed at the rear end of a motor truck or like vehicle, said driving wheels being so connected that one pair will idle while traveling over ordinary road surfaces and will only be thrown into driving connection when actually required.
Figure 2:
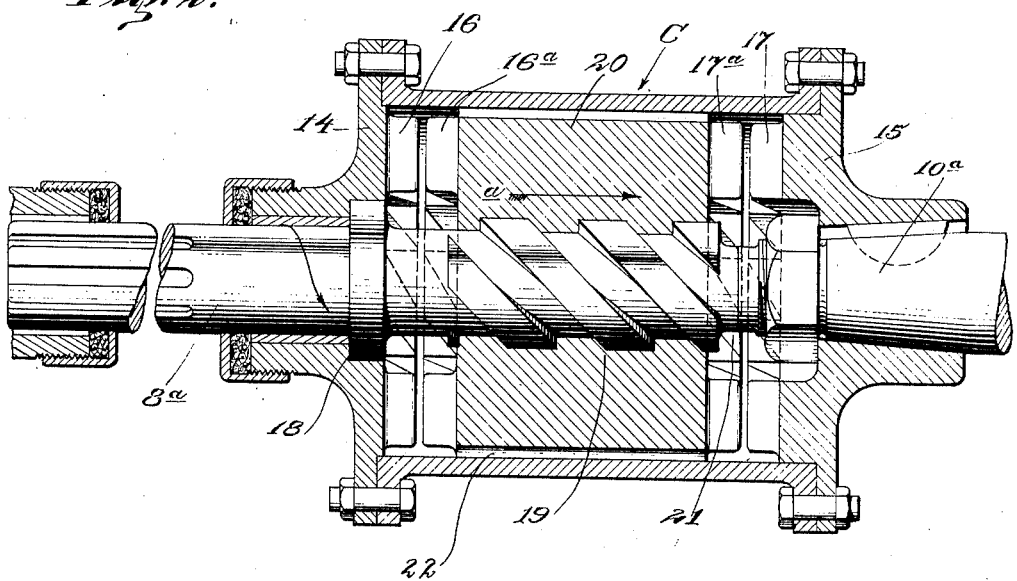
Fig. 2 is a central longitudinal section of the automatic driving clutch which is interposed between the two pair of driving wheels.
Figure 3:
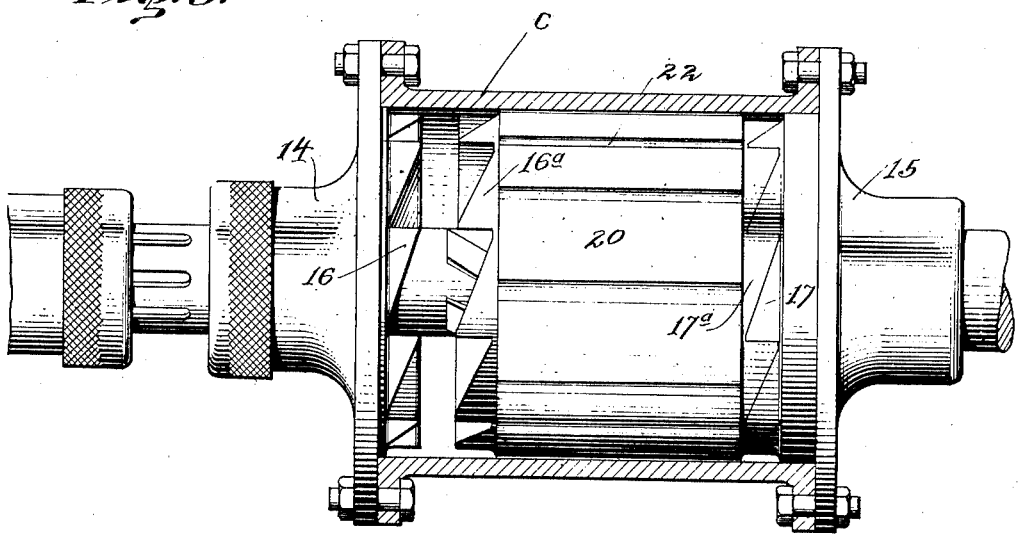
Fig. 3 is a plan view of the driving clutch, said view showing the housing in section.

Referring to the drawings in detail, and particularly Fig. 1, which shows the arrangement of two sets of driving wheels at the rear end of a motor truck or the like, A indicates a pair of driving wheels and B a pair of auxiliary driving wheels. Both sets of wheels are provided with standard driving axles journalled in axle housings 2—2 and 3—3, and both sets of wheels are provided with standard forms of differential such as indicated at 4 and 5. The foremost differential is driven by a standard form of propeller shaft 6 through means of a universal coupling 7. The differential may be driven through bevel gears or through a worm gear drive, but as the particular form of drive does not form any part of the present invention neither is actually shown. The universal coupling 7 drives a shaft 8 which extends completely through the differential housing 4. This shaft will hereinafter be referred to as the driving shaft. The opposite end of the shaft is provided with a universal coupling 9, and this coupling drives the shaft 10 of the differential 5 through means of a universal coupling 11 and an interposed automatic driving clutch generally indicated at C. This clutch is particularly illustrated in Figs. 2 and 3 and reference should be made to these figures.

The automatic driving clutch consists of a cylindrical shaped housing C on the opposite ends of which are bolted head members 14 and 15. A driving shaft $8^a$ extends through the head member 14 and is journalled therein to permit free rotation. The shaft $8^a$ is nothing more nor less than an extension of the drive shaft 8, but the drive shaft is in this instance made in two sections: to-wit, 8 and $8^a$, due to the interposition of the universal coupling 9.

A driven shaft $10^a$ is keyed or otherwise secured in the head member 15. This shaft is nothing more or less than the extension of the driven shaft 10, the driven shaft being also divided into two sections 10 and $10^a$, due to the interposition of the universal coupling 11.

Formed on the inner face of the head member 14 is a jaw clutch 16, and formed on the inner face of the head member 15 is a jaw clutch 17. Formed on the inner end of the drive shaft $8^a$ is a thrust collar 18, and forming an extension thereof is a threaded shaft 19. Mounted on the threaded shaft is a nut 20, and formed on each face or end of the nut are jaw clutch members 16ª and 17ª. The end of the threaded shaft 19 abuts the forward end of the driven shaft 10ª as shown at 21, and thrust in the rearward direction is thus taken up by the abutting shafts while thrust in a forward direction is taken up by the collar 18.

The housing C together with the head members 14 and 15 is carried entirely by the driven shaft 10ª.

The nut 20 is carried entirely by the threaded extension 19 of the drive shaft and as the frictional fit is maintained between the inner surface of the housing C and the exterior surface of the nut there is always a tendency for the nut to rotate in unison with the housing. This frictional fit is exceedingly important as it is depended upon to automatically engage or disengage the clutch members 16, 16ª and 17 and 17ª.

The interior of the housing is filled with grease or another suitable lubricant, and the exterior surface of the nut is fluted or grooved as indicated at 22 to permit free passing of the grease from one side of the nut to another as it moves longitudinally with relation to the housing, this grease being employed for the purpose of lubricating the movable parts and also to increase the frictional tendency between the nut and the interior of the housing.

The operation will be as follows: If power is transmitted to the propeller shaft 6, it is obvious that it will also be transmitted through the universal coupling 7 to the drive shaft 8 and through the universal coupling 9 to the opposite end of the drive shaft indicated at 8ª. Drive shaft 8 drives the universal coupling 9 and accordingly the foremost set of driving wheels indicated at A—A. If jaw clutch members 16 and 16ª happen to engage each other, power will also be transmitted from shaft 8ª to rotate the housing C and the driven shaft sections 10ª and 10. If the shaft 10 drives the differential 5, power will also be transmitted to the rear or auxiliary driving wheels B and B. Under normal load conditions, for instance, when a vehicle is traveling over flat or paved road surfaces, it is found that sufficient traction is obtained to drive the vehicle entirely through the foremost set of driving wheels indicated at A—A, and as this is the case it is not necessary to transmit power through the coupling member C to the rear or auxiliary driving wheels B. The wheels B—B are accordingly permitted to trail, and this is accomplished by employing tires of a diameter slightly less than the tires of the driving wheels A—A. By employing tires of a slightly less diameter the speed or rotation of the wheels B—B will be greater than the speed or rotation of the wheels A—A. The driven shaft 10 will in that case act as a driver, as it is driven by the wheels B—B through means of the differential. Shaft 10, being driven by these wheels, will rotate at a slightly greater speed than the drive shaft sections 8 and 8ª, and this rotation of the shaft 10 will cause the housing C to rotate at a greater speed than shaft 8ª, and as the housing C frictionally engages the nut 20, shaft 8ª tends to unscrew itself with relation to the nut, the pitch and angle of the threads being such that the nut will move in the direction of arrow a. The clutch sections 16 and 16ª are thus automatically disengaged, and the rear wheels B are free to trail.

On the other hand, if slippery roads or load conditions should be such that the main driving wheels A would lose their traction, shaft 8ª would increase in speed with relation to the driven shaft 10ª, and the threaded extension 19 of shaft 8ª would then retract the nut and impart movement thereto in the direction opposite to that indicated by arrow a. Clutch sections 16 and 16ª would then become automatically engaged and a driving connection would be formed between the shafts 8ª and 10ª, and power would be transmitted to the rear driving wheels B—B. When the speed of rotation of the driven shaft 10ª in the direction of the rotation of the driving shaft exceeds the speed of rotation of the driving shaft the housing "C" will be rotated with relation to the driving shaft 8ª and the threaded section 19 of the said shaft 8ª. Frictional engagement of the nut 20 with the housing will cause the nut to rotate with the housing and to have relative movement with relation to the threaded sections 19 of the shaft 8ª, with the result that the nut 20 will move in the direction of the arrow a in Fig. 2 and the teeth 16ª will recede from engagement with the teeth 16 of the housing. This action will continue until the teeth 17ª on the nut engage with the teeth 17 on the end plate 15 of the housing. As soon as this takes place the driving shaft and the driven shaft will be momentarily locked together and this will tend to choke the excessive speed of rotation of the driven shaft. The result will be that the driving shaft will attain a speed greater than the driven shaft and will cause the nut to be moved in a counterdirection to the arrow "a" so that the teeth 17 and 17ª will become disengaged.

It is in this manner that the driving connection is automatically established whenever conditions are imposed which require the assistance of the rear driving wheels B—B. The automatic clutch is also adapted to transmit a reverse drive to the driven shaft. It is for this reason that the clutch sections 17 and 17ª are employed. If shaft 8ª is reversed, movement is transmitted to the nut 20 through means of the threaded extension 19 in the direction of arrow a and the clutch sections 17 and 17ᵃ are thus engaged and the driving connection is formed through the same to the shaft 10ᵃ and the rear wheels driven thereby. All wheels will in that instance rotate in a reverse direction, and a reverse drive is obtained. The action of the automatic clutch is the same both ahead and reverse. If the driving wheels A—A are capable of driving the load, nut 20 merely advances until the clutch sections 16 and 16ᵃ are disengaged. In other words, the auxiliary wheels B—B may also act as idlers when reversing, but if the wheels A—A slip or lose their traction, the speed of the shaft 8ᵃ overcomes the speed of the shaft 10ᵃ and nut 20 is then further advanced and the clutches 17 and 17ᵃ engaged, thereby transmitting power to the auxiliary driving wheels.

A driving connection or clutch of this character is exceedingly important in four-wheel drives as, first, it permits one set of wheels to take care of normal driving and load conditions; secondly, it permits the second set of wheels to normally act as idlers or trailers; third, it permits a driving connection to be automatically established whenever the main driving wheels lose traction, thus throwing the auxiliary wheels into operation at the time required and then only; fourth, it permits these operations to take place whether traveling ahead or reverse.

The importance of these features will perhaps be better understood if it is considered that practically all four-wheel drives now in operation are positively driven from a common drive shaft; that is, shaft 8 is extended through the differential 4 and has direct connection with the differential 5. All four wheels are in that instance positively driven. Such a condition is not advantageous when considering tire wear or when considering the power consumed, due to the following reasons:

First, it is almost impossible to obtain two sets of tires of absolutely equal diameter. If the diameters are not equal and all wheels are positively driven the peripheral speed of one set or another will be greater and as they are positively driven excess tire wear will take place.

Secondly, a greater amount of power will be consumed, due to the slippage of one set of wheels and also due to the fact that power is transmitted through a greater number of gears and bearings at all times.

In the arrangement shown in the present application wheels B—B serve as idlers under all normal conditions. The tires are thus subjected to comparatively little wear and so is the differential and other driving connections employed.

In actual practice, when driving a truck equipped in the manner here illustrated, it is the best practice to place new tires on the foremost set of driving wheels indicated at A—A and to shift partially worn tires to the rear or auxiliary wheels B—B. This condition brings about the differential diameter which causes the rear wheels to over-drive the driven shaft 10, thereby causing normal disengagement of the clutches 16 and 16ᵃ. In other words, no power will be transmitted to the rear wheels except when traction is lost or slippage takes place on the part of the foremost driving wheels. If such slippage takes place, engagement of the clutches 16 and 16ᵃ automatically takes place and all four wheels serve as drives.

While the automatic driving clutch has here been shown in connection with the four-wheel drive, it is obvious that it may be employed in other types of drives and that the invention should not be limited to the application here illustrated.

Having thus described my invention, what I claim and desire to secure by Letters Patent is:—

1. The combination with a driving and a driven shaft normally rotatable independently of each other, of means interposed between the shafts whereby an automatic driving connection is formed between the shafts when the speed of the driven shaft exceeds the speed of the driving shaft and a positive interlocking of the shafts will result with an increase in the difference of the speeds of the said shaft to check the speed of the driven shaft.

2. The combination with a driving and a driven shaft normally uncoupled from each other, of means interposed between the shafts whereby an automatic driving connection is formed between the shafts when the speed of the drive shaft exceeds the speed of the driven shaft, and said means automatically disconnecting the driving connection when the speed of the drive shaft falls below that of the driven shaft and also operating to interlock the shafts and check the speed of the driven shaft.

3. The combination with a driving and a driven shaft of means interposed between the shafts whereby an automatic driving connection is formed between the shafts when the speed of the drive shaft falls below the speed of the driven shaft to disconnect the shafts and also to check the speed of the driven shaft, and means whereby a driving connection is formed between the shafts when the drive shaft is reversed.

4. The combination with a driving and a driven shaft of means interposed between the shafts whereby an automatic driving connection is formed between the shafts when the speed of the drive shaft falls below the speed of the driven shaft to disconnect the shafts and also to check the speed of the driven shaft, and means whereby a driving connection is automatically formed between the shafts when the drive shaft is reversed.

5. The combination with a driving and a driven shaft normally rotating independently of each other, of a clutch member carried by the driven shaft, a clutch member carried by the driving shaft, and means actuated by the driven shaft for automatically engaging the clutches when the speed of the driving shaft exceeds that of the driven shaft and for automatically disengaging the clutches when the speed of the driving shaft falls below that of the driven shaft and also for connecting the shafts and checking the driven shaft when the difference in the speed of the shafts increases.

6. The combination with a driving and a driven shaft normally uncoupled with respect to one another, of a clutch member carried by the drive shaft, a clutch member secured on the driven shaft, and means actuated by the speed of the driven shaft for automatically engaging and disengaging the clutches and for positively checking the speed of the driven shaft when the speed of the latter exceeds the speed of the driving shaft.

7. The combination with a driving and a driven shaft normally uncoupled with respect to one another, of a clutch member carried by the drive shaft, a cooperating clutch member carried by the driven shaft, and means actuated by variations in speed between the two shafts whereby the clutches are automatically engaged and disengaged and for positively checking the speed of the driven shaft when the speed of the latter exceeds that of the driving shaft.

8. In a four-wheel drive of the character described, a pair of main driving wheels and a pair of auxiliary driving wheels, a drive shaft adapted to drive the main driving wheels, a driven shaft adapted to drive the auxiliary driving wheels, and means interposed between the drive and the driven shafts whereby an automatic driving connection is formed between the shafts when the speed of the drive shaft falls below that of the driven shaft and the speed of the driven shaft positively checks the difference between the speed of the shafts increased to a predetermined degree.

9. In a four-wheel drive of the character described, a pair of main driving wheels and a pair of auxiliary driving wheels, a drive shaft adapted to drive the main driving wheels, a driven shaft adapted to drive the auxiliary driving wheels, means interposed between the drive and the driven shafts whereby an automatic driving connection is formed between the shafts when the speed of the drive shaft exceeds that of the driven shaft, and said means automatically disconnecting the driving connection when the speed of the drive shaft falls below that of the driven shaft and also automatically connecting the shafts and positively checking the driven shaft when the difference in speed increases to a predetermined degree.

10. In a four-wheel drive of the character described, a pair of main driving wheels and a pair of auxiliary driving wheels, a drive shaft adapted to drive the main driving wheels, a driven shaft adapted to drive the auxiliary driving wheels, means interposed between the drive and the driven shafts whereby an automatic driving connection is formed between the shafts when the speed of the drive shaft exceeds that of the driven shaft, said means automatically disconnecting the driving connection when the speed of the drive shaft falls below that of the driven shaft, and means whereby a driving connection is automatically formed between the shafts when the drive shaft is reversed, the latter means also automatically interlocking the shafts to positively check excessive speed of the driven shaft when the latter is rotating at a higher speed than the driving shaft.

11. In a four-wheel drive of the character described, a pair of main driving wheels and a pair of auxiliary driving wheels, a drive shaft adapted to drive the main driving wheels, a driven shaft adapted to drive the auxiliary driving wheels, a clutch member carried by the drive shaft, a clutch member carried by the driven shaft, and means actuated by the driven shaft for automatically engaging the clutches when the speed of the drive shaft exceeds the speed of the driven shaft and for automatically disengaging the clutches when the speed of the drive shaft falls below that of the driven shaft, and for positively checking excessive speed of the driven shaft when the latter is rotating at a higher rate of speed than the driving shaft.

12. In a four-wheel drive of the character described, a pair of main driving wheels and a pair of auxiliary driving wheels, a drive shaft adapted to drive the main driving wheels, a driven shaft adapted to drive the auxiliary driving wheels, a clutch member carried by the drive shaft, a clutch member carried by the driven shaft, means actuated by the driven shaft for automatically engaging the clutches when the speed of the drive shaft exceeds the speed of the driven shaft and for automatically disengaging the clutches when the speed of the drive shaft falls below that of the driven shaft, a second clutch carried by the driven shaft, a second clutch carried by the drive shaft, and means for automatically connecting said clutches when the drive shaft is reversed, the latter means also interlocking the shafts and positively checking the excessive speed of the driven shaft when the latter is rotating at a higher speed than the driving shaft.

13. In combination, a driving shaft, a second shaft normally idle with respect to, and driven independently of, said driving shaft, and means for automatically connecting and disconnecting said shafts, said means comprising mechanism associated with the ends of the shafts for positively connecting them when the speed of the driving shaft exceeds the speed of said second shaft and for disconnecting them when the speed of said second shaft increases slightly over that of said driving shaft.

14. In the combination defined in claim 13, said mechanism including means for positively interconnecting the shafts upon excessive increase in the speed of the said second shaft over that of the driving shaft.

15. In combination, a pair of rotatable shafts, one of which has a threaded end, a member mounted on said threaded end for a rotation therewith and for relative longitudinal movement, a housing fixed to the other shaft for rotation therewith and for frictional engagement with said member, clutch means carried on the under side of at least one end of said housing, and cooperating clutch means carried on the corresponding end of said member.

16. In the combination defined in claim 15, said member being of substantially cylindrical form and provided with longitudinal grooves.

17. In the combination defined in claim 15, a wheel and axle construction having a differential mechanism coupled to one of said shafts, and a second wheel and axle construction arranged in tandem with the first and having a differential mechanism coupled with the other of said shafts.

18. In a vehicle construction, a pair of tandem axles, each carrying a pair of tired wheels capable of being driven, a differential for each axle, driving means for one of said differentials, a drive shaft extending from said means toward the other differential, a rotatable shaft projecting from said other differential into proximity to said drive shaft, and means associated with said shafts for coupling and uncoupling them upon variations in their relative speeds of rotation, and the diameters of the combined wheels and tires of one set of said tandem tired wheels being appreciably less than the diameter of the other set.

HORATIO W. SMITH.